Figure 1:
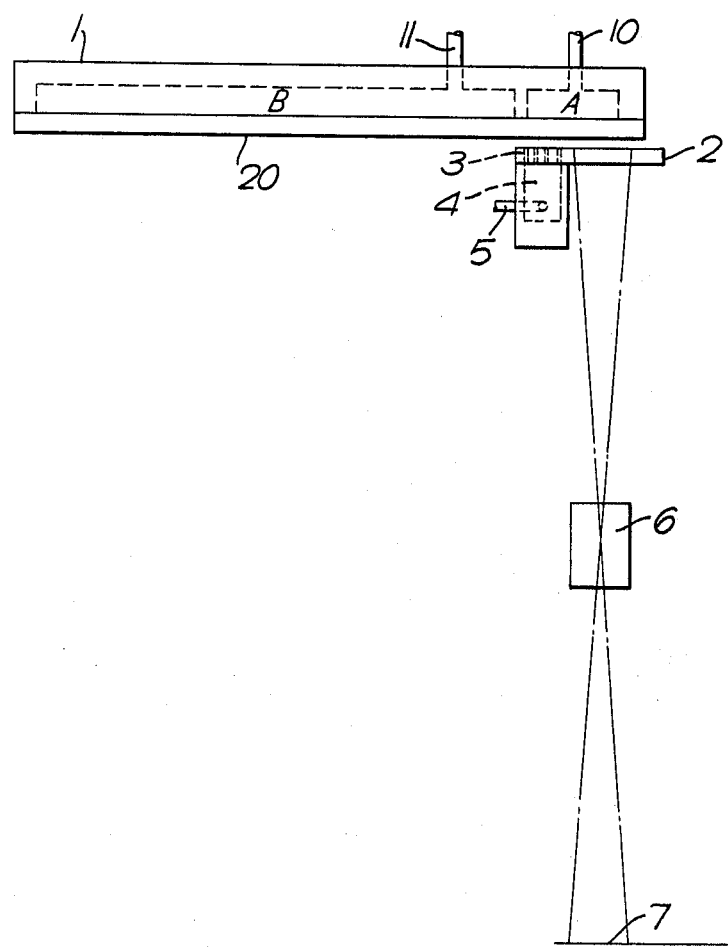

United States Patent [19]

Spence-Bate

[11] 4,099,867

[45] Jul. 11, 1978

[54] FILM PLATENS

[76] Inventor: Harry Arthur Hele Spence-Bate, 1 Cheam Pl., Morley, Australia, 6062

[21] Appl. No.: 713,359

[22] Filed: Aug. 11, 1976

[30] Foreign Application Priority Data

Aug. 20, 1975 [AU] Australia .............................. 2859/75

[51] Int. Cl.² ...................... G03B 27/60; G03B 27/32
[52] U.S. Cl. ......................................... 355/73; 355/77
[58] Field of Search ....................... 355/73, 76, 39, 40, 355/77

[56] References Cited

U.S. PATENT DOCUMENTS

| 2,682,193 | 6/1954  | Schubert et al. | 355/77   |
| 2,814,233 | 11/1957 | Anander         | 355/73   |
| 2,836,099 | 5/1958  | Weishaupt       | 355/73 X |
| 2,881,658 | 4/1959  | Bornemann       | 355/73 X |
| 2,933,014 | 4/1960  | Anander         | 355/73   |
| 3,289,530 | 12/1966 | Samain          | 355/77 X |
| 3,963,346 | 6/1976  | Wiessner        | 355/73   |

FOREIGN PATENT DOCUMENTS 1,388,163   3/1975   United Kingdom ................... 355/73

Primary Examiner—Donald Griffin
Attorney, Agent, or Firm—Fidelman, Wolffe & Waldron

[57] ABSTRACT

A microfiche or microfilm camera in which a main suction platen having preferably several vacuum chambers each connected to a group of slots formed in a flat film receiving plate of the main suction platen wherein the main platen is moved from a film pick-up station to possibly a main filming station but certainly to a titling station at which a further suction platen may be provided to hold a portion of the film while a title is recorded on the film by means of a titling lens. The main platen can release the film at the titling station while the further platen continues to hold the film until titling is completed when the further platen releases the film to a disposal station.

7 Claims, 3 Drawing Figures

FILM PLATENS

The present invention relates to improvements in platens for holding and picking up microfiche laminae.

In known platens used in microfiche cameras designed by myself the platen surface comprises a machined flat plate in which a number of holes are formed. These holes communicate with chambers within the platen and these in turn communicate with a source or sources of vacuum by means of which a microfiche can be sucked onto and held by the platen. In one method of forming these holes photo-etching has been used and in another method where photo-etching facilities are not available the holes have been drilled. The photo-etching method involves the use of specialised equipment which is not always available and the drilling method is time consuming and expensive.

Thus according to the invention there is provided a microfiche or microfilm camera incorporating a suction platen which comprises a flat film receiving plate at least one vacuum chamber enabled by means of a vacuum inlet to be connected to a source of vacuum and a group of slots formed in the plate providing communication between the chamber and a film receiving surface on the plate.

Preferably, there are at least three said vacuum chambers forming main chambers arranged in proximity side by side along a long side of rectilinear plate, and a further small subsidiary chamber may be provided at the centre and near the edge of the long side so as to be at least partly co-extensive with titling area on a said microfiche. The main chambers are preferably connected to one said vacuum inlet while the subsidiary chamber is connected to a second vacuum inlet. Each chamber in the embodiment is provided with a corresponding group of said slots.

The invention also consists in a method of titling a microfiche or microfilm in a microfiche or microfilm camera comprising sucking the film on to a first suction platen moving said first suction platen to atitling station sucking at least a portion of the film on to a further suction platen and recording a title on the film.

Figure 2:
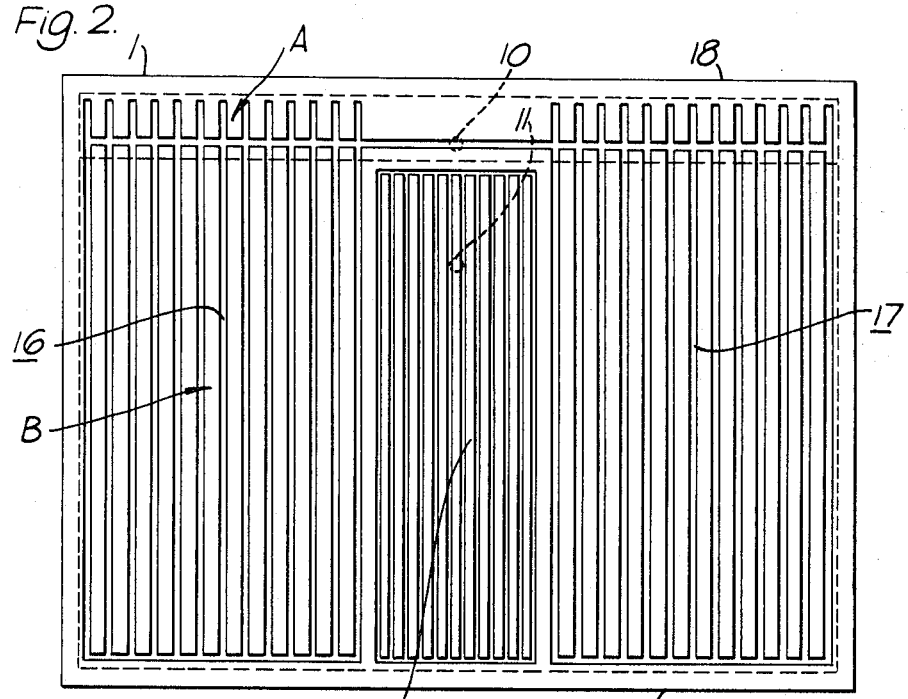
Figure 3:
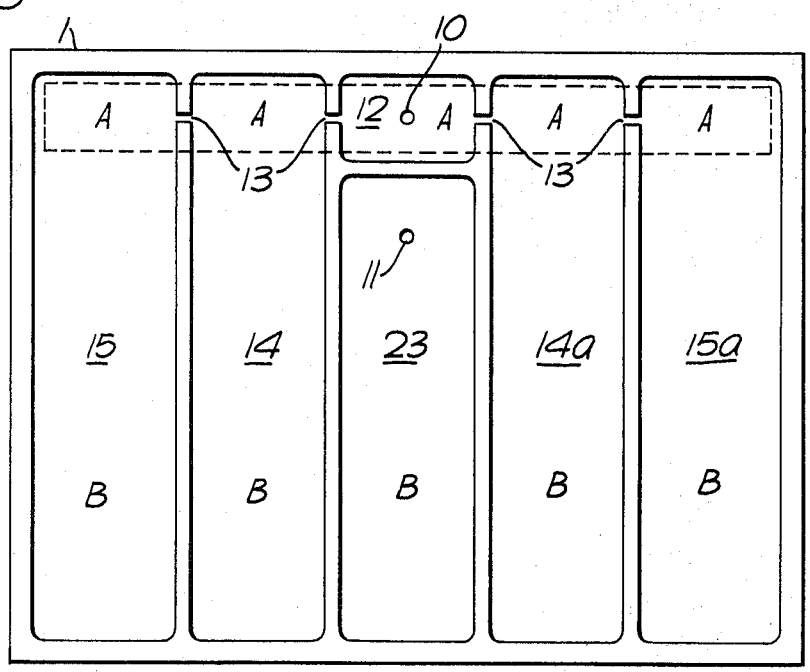

The invention will now be described with reference to the accompanying drawings in which:

FIG. 1 shows diagrammatically a part of a microfiche camera with a film platen mounted above a titler vacuum chamber and lens, FIG. 2 shows the underside film receiving surface of the film platen, FIG. 3 shows vacuum chambers within the film platen of FIG. 2.

In the drawings there is shown a microfiche camera vacuum platen 1 positioned above a titler vacuum platen 2 (FIG. 1) in which holes 3 communicate with a titler vacuum camber 4 which is provided with a conduit 5 communicating with a source of vacuum. The titler platen 2 is positioned above titler lens 6 and above the titler card copying position 7.

It will be seen in FIGS. 1 and 2 that the platen 1 is internally divided into vacuum areas A and B, A corresponding to the title area of a microfiche and B corresponding to the area on which the principle information is recorded. Each area A and B are separately provided with vacuum inlet conduits 10 and 11 respectively.

In FIGS. 2 and 3 it will be seen that inlet 10 is in direct communication with subsidiary chamber 12 and thence by holes with main chambers 14, 14a and 15, 15a in that succession. The chambers 12 to 15 are also connected by slots in groups 16 and 17 which run between the long sides 18 and 19 of the rectilinear plate 20 of the platen 1. These slots are formed in the microfiche film receiving surface of the plate 20 and provide communication between the chambers 12 to 15 and the film receiving surface of the plate.

A further group of slots 22 communicate with a central chamber 23 which is provided with the inlet 11.

In operation the microfiche film is picked up by the group of slots 22 then held by slots corresponding to chambers 14 and 14a then by slots corresponding to chambers 15 and 15a. The platen 1 is then moved to the titler position shown in FIG. 1 where the vacuum applied via inlet 10 is transferred to titler inlet 5 and microfiche titler area is sucked on to the titler platen 2 while the film is still held by vacuum applying through inlet 11 in chamber 23 and on to slot group 22. As soon as the vacuum in the titler chamber 4 indicates a successful transfer, the inner chamber 23 is disconnected from the source of vacuum and the titler platen 2 takes over complete retention of the microfiche. The platen 1 is then moved to a film pick-up position while the titling process is being carried out. Disposal of the microfiche from the camera may be carried out from the titler position by release of vacuum from the titler chamber, allowing the microfiche to drop by means of gravity from the titling chamber at a titling station.

For the sake of clarity the means for moving and positioning the camera platen 1 is not shown but a suitable means is shown and described in U.S. Pat. No. 3,628,865. Also the present camera may be provided with a main camera recording lens arrangement as shown and described in my U.S. Pat. No. 3,826,571. It will be obvious to those skilled in the art that microfiches on which the principle information is recorded can be passed straight from pick-up station to principle recording station to the titling station or straight from the pick-up station to the titling station.

I claim:

1. A microfiche or microfilm camera incorporating a suction platen which comprises a single flat plate having a film receiving surface, a plurality of interconnected vacuum chambers enabled by means of suitable vacuum inlets to be connected to sources of vacuum, said plate forming one wall of said vacuum chambers, and a group of closely spaced generally parallel slots penetrating said plate and extending throughout substantially the entire length thereof and communicating directly between the chambers and the film receiving surface on the plate, said chambers being internally divided into two vacuum areas, one area corresponding to the title area of a microfiche and the other area corresponding to the area on which the principal information is recorded.

2. A camera as claimed in claim 1 wherein the suction platen is formed with a rectilinear shape having two long sides and two short sides and wherein the film receiving plate is similarly shaped, at least four vacuum chambers being provided within the platen, at least three of which chambers forming main chambers being formed with an elongated rectilinear shape having their long sides parallel with the short sides of the platen and arranged in proximity side by side, said main chambers being connected to a first vacuum inlet, a fourth said chamber forming a subsidiary chamber unconnected with said main chambers and being of an elongate rectilinear shape having its long sides parallel with the long side of the platen and near the edge of the long side, said subsidiary chamber being connected to a second vacuum inlet.

3. A camera as claimed in claim 1 wherein the suction platen is formed with a rectilinear shape having two long sides and two short sides, and wherein the film receiving plate is similarly shaped, at least three said vacuum chambers forming main chambers arranged in proximity side by side each having an elongate shape with their long sides parallel to the short sides of the platen and connected to a first vacuum inlet, and a further vacuum chamber forming a subsidiary chamber unconnected with said main chambers and smaller than any of the main chambers provided at the centre and near the edge of the long side of the suction platen, said subsidiary chamber being connected to a second vacuum inlet.

4. A camera as claimed in claim 1 wherein a further suction platen is provided at a titling station to which station the said first suction platen is movable and wherein a film carried on the first suction platen may be at least partially transferred to said further platen by means of applying a vacuum to said further platen and releasing the vacuum within at least part of said first suction platen, said camera including a main lens and a titling lens, whereby a title can be recorded on the film at the titling station by means of the titling lens.

5. A method of titling a microfiche or microfilm in a microfiche or microfilm camera comprising sucking the film on to a first suction platen moving said first suction platen to a titling station sucking at least a portion of the film on to a further suction platen and recording a title on the film.

6. A method of titling as in claim 5 wherein said first suction platen releases the film while retaining the film on said further suction platen.

7. A method of titling as claimed in claim 6 wherein said further suction platen releases the film allowing the film to fall by means of gravity from the titling station for disposal from the camera.

* * * * *